United States Patent [19]

McClure

[11] 3,927,946
[45] Dec. 23, 1975

[54] RING LASER FREQUENCY BIASING MECHANISM

[75] Inventor: Robert E. McClure, Locust Valley, N.Y.

[73] Assignee: Sperry Rand Corporation, New York, N.Y.

[22] Filed: Mar. 21, 1968

[21] Appl. No.: 714,891

[52] U.S. Cl. ...... 356/106 LR; 350/151; 331/945 A; 332/7.51
[51] Int. Cl.² .......................................... H01S 3/10
[58] Field of Search ............ 350/151, 161; 356/106, 356/28, 152, 106 RL; 331/94.5; 332/7.51

[56] References Cited
UNITED STATES PATENTS

| | | | |
|---|---|---|---|
| 3,392,622 | 7/1968 | Senf | 356/106 |
| 3,418,483 | 12/1968 | Fan | 350/151 x |

OTHER PUBLICATIONS

Alstad et al. *Magneto–Optic Readout Device*, "IBM Technical Disclosure Bulletin", Vol. 9, No. 12, May 1967, pp. 1763-1764.

*Primary Examiner*—Maynard R. Wilbur
*Assistant Examiner*—N. Moskowitz
*Attorney, Agent, or Firm*—S. C. Yeaton; H. P. Terry; T. J. Scott

[57] ABSTRACT

A ring laser cavity forming component including a magnetically saturable member for differentially phase shifting the contradirectional waves propagating in the laser cavity, the phase shift being produced by the magneto-optic interaction occurring between the light waves and the magnetization in the cavity forming component as the light waves are reflected therefrom.

6 Claims, 2 Drawing Figures

3,927,946

RING LASER FREQUENCY BIASING MECHANISM

BACKGROUND OF THE INVENTION

The present invention relates to ring lasers and more particularly to means for differentially phase shifting the contradirectional light waves propagating in a ring laser to produce a discrete difference between the frequencies of the waves and thereby preclude mode locking.

A ring laser comprises an active lasing medium disposed relative to reflective or refractive optical cavity forming components adapted to direct light waves emitted from the active medium in opposite directions around a closed loop planar path. Oscillatory modes occur at those frequencies for which the closed loop path length is an integral number of light wavelengths. Hence, the contradirectional light waves oscillate at the same frequency when their respective path lengths are equal and at different frequencies when the path lengths are unequal as occurs, for example, when the cavity is rotated about an axis perpendicular to the propagation plane of the light waves. The rotational rate may be measured by extracting from the cavity a small portion of the energy in each light wave by partial transmission through or reflection from one of the cavity forming components. Combining means external to the cavity directs the light waves in collinear relation onto a photodetector which provides an electrical beat frequency signal corresponding to the difference between the light wave frequencies. The difference frequency is linearly related to rotation rate for comparatively fast rotation but as the rate decreases the relationship becomes non-linear because of coupling between each light wave and a backscattered component of the oppositely propagating wave. As the rotation rate decreases even further, but while still at some finite value, the coupling becomes sufficiently strong to synchronize the contradirectional waves resulting in an abrupt cessation of the beat frequency signal. This frequency synchronizing phenomenon is referred to as mode locking and the corresponding beat frequency or rotational rate at which it occurs is called the mode locking threshold. To avoid mode locking and the consequent inability of the ring laser to sense rotational rates, an non-reciprocal phase shift must be imparted to the waves by either rotating the ring in the aforesaid manner or inserting in the propagation path some means such as a birefringent member operating in combination with polarization converters or rotators for differentially affecting the path length of the respective waves. A birefringent medium exhibits discrete propagation constants to orthogonally polarized waves propagating through it. Thus, if the contradirectional waves are orthogonally polarized while traversing the birefringent material, their closed loop path lengths will be unequal. As a result, the waves will oscillate at different frequencies and if the difference frequency is sufficiently large, mode locking will not occur. Under these conditions, rotation of the ring laser will either increase or decrease the beat frequency thereby providing an indication of both rate and sense of rotation. Although frequency biasing cells comprising birefringent devices used in conjunction with polarization converters or rotators have been very successful in avoiding mode locking they have also created other problems which detract from their utility. More specifically, use of such frequency bias cells increases the cost of the rotation sensor and makes it more difficult to align. In addition, the bias cell increases backscatter which in turn increases the coupling between the contradirectional waves causing the mode locking threshold to increase. This reduces the dynamic rotation rate sensing range which is determined by the difference between the nominal beat frequency and the locking frequency. Further, since the birefringent medium must be positioned in either a high intensity electric or magnetic field, depending upon the nature of the medium, the source of excitation for the field must be closely regulated to prevent drift of the nominal frequency bias.

SUMMARY OF THE INVENTION

The present invention provides means for differentially phase shifting the contradirectional waves in a ring laser to produce a frequency bias without the necessity for either rotating the ring or inserting additional components into the propagation path. Operation of the inventive apparatus is based on the classical Kerr magneto-optic effect which indicated that a light beam was phase shifted upon being reflected from a magnetized surface. The phase shift produced in this manner was first detected by observing that a light wave plane polarized either parallel or perpendicular to the plane of incidence of a reflective member, magnetized in a direction parallel to the plane of incidence and perpendicular to the reflective surface, became elliptically polarized upon being reflected therefrom with the major axis of the ellipse rotated with respect to the incident plane polarized light. It was subsequently observed that a reversal of the direction of magnetization in the reflective member caused the major axis of the ellipse to be rotated in the opposite direction relative to the incident plane polarized light and also produced a reversal of the sense of rotation of the polarization vector. The present invention is based on the recognition that the Kerr magneto-optic effect will phase shift the incident wave without producing a Kerr component perpendicular to the incident wave, that is, without converting the plane polarized wave to an elliptic polarization, for an appropriate orientation of the light polarization relative to the magnetization in the reflected member and further that a reversal of the direction of the phase shift is obtained when the direction of magnetization is held constant while the propagation paths of the incident and reflected waves are interchanged. This condition is uniquely satisfied in a ring laser wherein the incident and reflected paths of the contradirectional wave are interchanged at a corner mirror of the laser cavity. Thus, the Kerr magneto-optic effect may be used to frequency bias a ring laser by providing a suitably magnetized cavity forming corner mirror. This is accomplished by constructing a corner mirror including a magnetically saturable member magnetized in a direction perpendicular to the plane of the ring laser cavity for interaction with light waves polarized parallel to the plane of the cavity. These relative orientations of the magnetization and light polarization provide the additional advantage of precluding Faraday rotation effects inasmuch as neither the propagational directions of the light beams, nor any vector components thereof, are aligned parallel to the direction of magnetization.

DESCRIPTION OF THE PREFERRED EMBODIMENT

Figure 1:
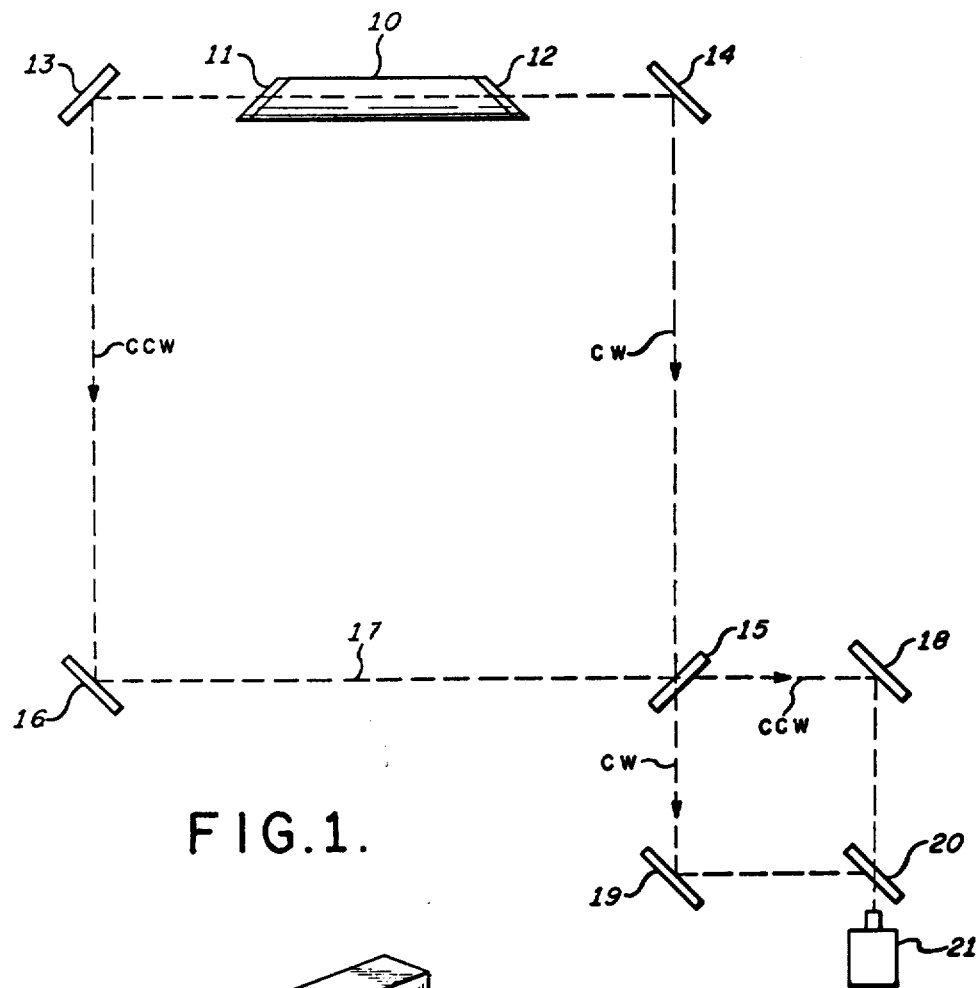
FIG. 1 is a schematic of a ring laser optical cavity incorporating the invention.

Referring to FIG. 1, an active lasing medium, such as the standard He-Ne gas mixture energized by conventional r.f. means (not shown), contained within glass tube 10 emits light waves in both directions along its longitudinal axis through optical flats 11 and 12 sealing the ends of the tube. Optical cavity forming mirrors 13, 14, 15 and 16 successively reflect the contradirectional light waves around a closed loop path 17. The optical flats are inclined at Brewster's angle with respect to the longitudinal axis of tube 10 to provide light waves plane polarized parallel to the plane of the optical cavity, light so polarized being referred to hereinafter as horizontally polarized.

A measure of the difference between the frequencies of the contradirectional waves resulting from non-reciprocal effects present in the optical cavity is obtained by transmitting part of the energy in each beam through corner mirror 15 to a combiner mechanism comprising mirrors 18 and 19, beam splitter 20 and photodetector 21. The component of the clockwise (cw) light wave transmitted through corner mirror 15 is first reflected from combiner mirror 19 and then partially reflected from beam splitter 20 onto the photodetector. Likewise, the portion of the counterclockwise (ccw) wave extracted from the cavity is reflected from combiner mirror 18 and partially transmitted through the beam splitter in collinear relation with the clockwise wave onto photodetector 21 wherein the light waves mix to produce a beat frequency signal equal to the difference between their frequencies.

To overcome the mode locking which occurs at low rotational rates, a non-reciprocal phase shifting effect is incorporated in the optical cavity by means of a magnetic field established in corner mirror 16. The magnetization in the corner mirror interacts with the incident contradirectional waves in such a manner that a differential phase shift is imparted to the waves in the process of being reflected from the mirror. As a result, the contradirectional waves oscillate at different frequencies so that mode locking does not occur even when the optical cavity is stationary. The magnetization in the corner mirror is oriented perpendicular to the plane of the optical cavity and the light waves are horizontally polarized as previously mentioned. These conditions of polarization and magnetization provide the desired differential phase shift while simultaneously preserving the polarization of the light waves. If, on the other hand, the magnetization is oriented parallel to the plane of the cavity and either parallel or perpendicular to a major surface of the mirror, a differential phase shift may be produced but the phase shift will exist in a light wave component orthogonally polarized with respect to the incident horizontally polarized light and as a result the reflected light will be elliptically polarized. Moreover, the light component of interest, namely, the phase shifted component will not propagate through the polarizing Brewster angle windows on the ends of the lasing tube as a consequence of being polarized orthogonal to the transmission axis thereof. It should also be noted that certain combinations of magnetization and light polarization will not produce any differentially phase shifted component at all. This situation exists, for instance, when the magnetization is perpendicular to the plane of the cavity and the light is plane polarized in a direction orthogonal to the horizontal polarization.

Figure 2:
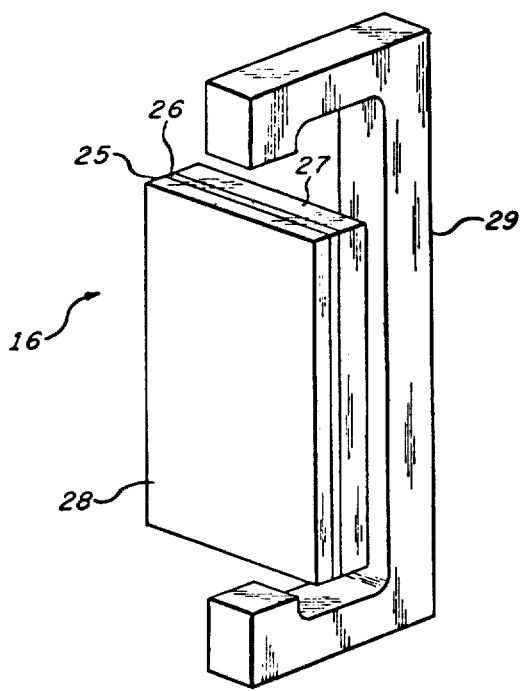
FIG. 2 is a perspective view of a preferred embodiment of the invention.

Referring to FIG. 2, the non-reciprocal phase shift inducing mirror 16 comprises thin films of a high reflectivity multi-layer dielectric 25 and a magnetically saturable layer 26 deposited on substrate 27 by vacuum evaporation. The magnetically saturable layer is constructed of a ferromagnetic material such as iron, nickel or cobalt having a high density of electron spins which can be uniformly aligned under the influence of an applied magnetic field. The multi-layer dielectric may be constructed, for example, of zinc sulfide and cryolite or other materials having indices of refraction sufficiently different from that of the magnetically saturable layer. Quartz may be used for the support substrate. Successful operation has been achieved using a dielectric layer approximately 15,000 Angstroms thick deposited on iron having a thickness on the order of several hundred Angstroms, the thickness of the support substrate being inconsequential. The phase shift is produced by the magnetization in the ferromagnetic metallic layer, the multi-layer dielectric being added primarily to preclude excessive absorption loss in the iron which has a reflectivity of about 70 percent considerably lower than that of the multi-layer dielectric. The multi-layer also permits, by means of adjusting the layer thickness dimensions, preferably the thickness of the first dielectric layer, the achievement of a maximum amount of differential phase shift while simultaneously minimizing possible differential reflectivity. The magnetizable layer should have a fairly high reflectivity but not so high as to preclude the light waves from penetrating it sufficiently to interact with the magnetic field. Magnetization parallel to the major surface 28 of the thin films is provided by an electro or permanent magnet 29. If the magnetized layer has a sufficiently square hysteresis characteristic, the magnet may be removed when the mirror is placed in position to form the optical cavity. But if the magnetized layer does not retain enough magnetism to remain in a saturated state, it will generally be necessary to mount the magnet adjacent to the mirror when it is installed in the laser cavity. Maintaining the ferromagnetic layer in a saturated state enhances the magnitude of the phase shift and reduces the likelihood of drift in the nominal frequency bias. The latter feature is particularly important since a variation of the frequency bias may be misconstrued as a rotational rate sensed by the ring. A mirror constructed as shown in FIG. 2 produced a frequency bias of 18kc in a 48 inch optical path ring laser operating at 1.15 microns with the iron and dielectric providing a combined reflectivity of 94 percent.

It is therefore seen that the drift problem attendant to prior art ring laser frequency biasing devices is eliminated. In addition, the ability to bias the ring without the necessity for inserting additional components into the optical cavity eliminates a source of backscatter and reduces equipment cost. Moreover, since the magnetic layer is preferably magnetized parallel to a major surface, that is, in the easy magnetization direction, the magnetic field which is required is substantially less than that needed for the birefringent materials used in the prior art.

An alternative form of the non-reciprocal phase shift inducing mirror which has also provided satisfactory operation, includes thin films of a multi-layer dielectric or a metal such as gold and a ferromagnetic saturable layer successively deposited on a quartz substrate. In this case, the magnetically saturable layer is only about 25 Angstroms thick while the dielectric or gold has a thickness on the order of 1,000 Anstroms. Another embodiment may be provided by using alternate quarter wavelength layers of a dielectric and a ferrimagnetic material such as yttrium iron garnet (YIG).

While the invention has been described in its preferred embodiments, it is to be understood that the words which have been used are words of description rather than limitation and that changes within the purview of the appended claims may be made without departing from the true scope and spirit of the invention in its broader aspects.

I claim:

1. A ring laser comprising
means forming a closed loop optical path comprising a mirror including a magnetically saturable member magnetized in a direction perpendicular to the plane of said optical path,
an active laser medium positioned in the closed loop path for propagating contra-directional light waves therein, said light waves being plane polarized parallel to the plane of said path,
means for extracting from the optical path a portion of the energy in each of the contra-directional waves, and
means for combining the extracted wave energies to produce an electrical signal having a frequency equal to the frequency difference between said extracted wave energies.

2. The apparatus of claim 1 wherein the mirror further includes a reflective member having substantially higher reflectivity than the magnetically saturable member and a support member, the reflective and magnetically saturable members being constructed in the form of thin films deposited on the support member.

3. The apparatus of claim 2 wherein the magnetically saturable member is in a magnetically saturated condition.

4. The apparatus of claim 2 wherein the magnetically saturable member is positioned intermediate the support and reflective members.

5. A ring laser comprising
means forming a ring laser optical cavity comprising a mirror including a magnetically saturable member,
an active lasing medium positioned in the optical cavity such that light waves emitted from the lasing medium are directed by the cavity forming components to propagate in opposite directions around a closed loop path, said oppositely directed light waves being plane polarized parallel to the plane of the ring laser cavity, and
means for magnetizing said magnetically saturable member in a direction normal to the plane of said optical cavity.

6. A ring laser comprising
a plurality of light redirecting components forming a closed loop optical path, at least one of said light redirecting components being a mirror including a magnetically saturable member magnetized in a direction perpendicular to the plane of said optical path,
an active laser medium positioned in the closed loop path for propagating contra-directional light waves therein, said light waves being plane polarized parallel to the plane of said path, and
means for extracting from the optical path a portion of the energy in each of the contra-directional waves.

* * * * *